(12) United States Patent
Chen

(10) Patent No.: US 6,408,638 B1
(45) Date of Patent: Jun. 25, 2002

(54) PIPE FREEZER WITH QUICK CONNECT EVAPORATOR HEADS

(75) Inventor: Limin Chen, Melville, NY (US)

(73) Assignee: Spectronics Corporation, Westbury, NY (US)

( * ) Notice: Subject to any disclaimer, the term of this patent is extended or adjusted under 35 U.S.C. 154(b) by 0 days.

(21) Appl. No.: 09/921,353

(22) Filed: Aug. 2, 2001

(51) Int. Cl.[7] ................................................. F25D 3/00
(52) U.S. Cl. .......................................... 62/293; 62/66
(58) Field of Search ...................... 62/293, 66; 137/13, 137/251.1; 165/80.1

(56) References Cited

U.S. PATENT DOCUMENTS

| 4,267,699 A | * | 5/1981 | Bahrenburg | 62/293 |
| 5,548,965 A | * | 8/1996 | Chen et al. | 62/293 |
| 5,680,770 A | * | 10/1997 | Hall et al. | 138/97 |
| 5,836,167 A | * | 11/1998 | Clouston et al. | 62/293 |
| 6,141,972 A | * | 11/2000 | Evans | 62/293 |
| 6,286,329 B1 | * | 9/2001 | Radichio | 62/293 |

* cited by examiner

Primary Examiner—William C. Doerrler
Assistant Examiner—Mohammad M Ali
(74) Attorney, Agent, or Firm—Drinker Biddle & Reath LLP

(57) ABSTRACT

A portable pipe freezer apparatus includes a condenser/compressor unit and a pair of flexible coaxial hoses each connected to an evaporator head with a set of interchangeable adapters configured with one or more nearly semicircular channels conforming to a standard pipe diameter. The adapters hold the evaporation chamber in a position such that the length axis of the chamber is aligned parallel to the axis of the pipe and the hose coupling is oriented perpendicular to the length axis of the chamber. Inside the chamber, a baffle placed between the outlet of the inner tube of the hose and the return to the outer tube forces refrigerant sprayed out of the inner tube to migrate from essentially the midway point of the chamber to an end wall and then back toward the midway point before entering the outer tube. In a preferred embodiment, the evaporation chamber is in the shape of a right cylinder closed by a pair of end plates, and is covered with a protective sleeve to protect the evaporation chamber from dents and scratches.

13 Claims, 8 Drawing Sheets

PIPE FREEZER WITH QUICK CONNECT EVAPORATOR HEADS

FIELD OF THE INVENTION

This invention relates generally to portable apparatus for freezing the liquid contents of pipes for working on the pipe, and to the more particular field of portable pipe freezers that use a refrigerant cycle for cooling the pipe.

BACKGROUND OF THE INVENTION

Pipe freezers are used in repairing or replacing pipe sections or repairing or adding fittings. When there is no convenient shut-off valve, the effect of blocking flow in the pipe can be achieved by freezing the water in a section of the pipe. The frozen section acts as an ice plug that blocks flow.

Some pipe freezer devices use frozen $CO_2$ (dry ice) for the heat transfer to freeze the section of pipe. This invention however, relates to devices that use a refrigerant in a refrigeration cycle for the heat transfer. Such devices are described, for example, in U.S. Pat. No. 5,548,965. The same patent describes an evaporator head with multiple channels sized to fit various standard pipe diameters. Two evaporator heads are connected to a portable condenser/compressor unit by flexible coaxial tubes that cycle refrigerant to and from the evaporation chambers.

This invention improves upon the pipe freezer of U.S. Pat. No. 5,548,965 by structural differences that make it easier to install the evaporator heads in some situations and internal structural differences that improve the evaporation heat exchange.

SUMMARY OF THE INVENTION

The invention is in an apparatus for freezing the contents of a pipe through the use of a refrigeration cycle. The apparatus includes a portable condenser/compressor unit and a pair of flexible coaxial hoses connected to an evaporation chamber. A set of interchangeable adapters configured with one or more nearly semicircular channels conforming to a standard pipe diameter are used to place the evaporation chamber along and in heat transfer conduction with a section of a pipe. The adapters are configured to hold the evaporation chamber in a position such that the length axis of the chamber is aligned parallel to the axis of the pipe. The evaporation chamber has its hose coupling located approximately midway along its length dimension and is oriented perpendicular to the length axis of the chamber. This angle of connection into the adapter makes it easier to install when the pipe is close to a wall or structure that interferes with the hose being parallel to the pipe. Inside the chamber, a baffle placed between the outlet of the inner tube of the hose and the return to the outer tube forces refrigerant sprayed out of the inner tube to migrate from essentially the midway point of the chamber to an end wall and then back toward the midway point before entering the outer tube. This migration path allows more efficient evaporation in the chamber and thus more efficient heat exchange. In a preferred embodiment, the evaporation chamber is in the shape of a right cylinder closed by a pair of end plates. The chamber is constructed of a heat conductive metal, preferably aluminum. Also preferred is to protect the evaporation chamber from dents and scratches by installing over it a replaceable open cylindrical sleeve.

DETAILED DESCRIPTION OF SEVERAL EMBODIMENTS OF THE INVENTION

The invention is in improvements to a portable pipe freezer apparatus as disclosed in U.S. Pat. No. 5,548,965. The description of the preferred embodiments of that patent are adopted herein by reference so that it will not be necessary to repeat common elements. In brief description, however, FIG. 9 shows the basic elements of that prior portable pipe freezer apparatus.

Figure 9:
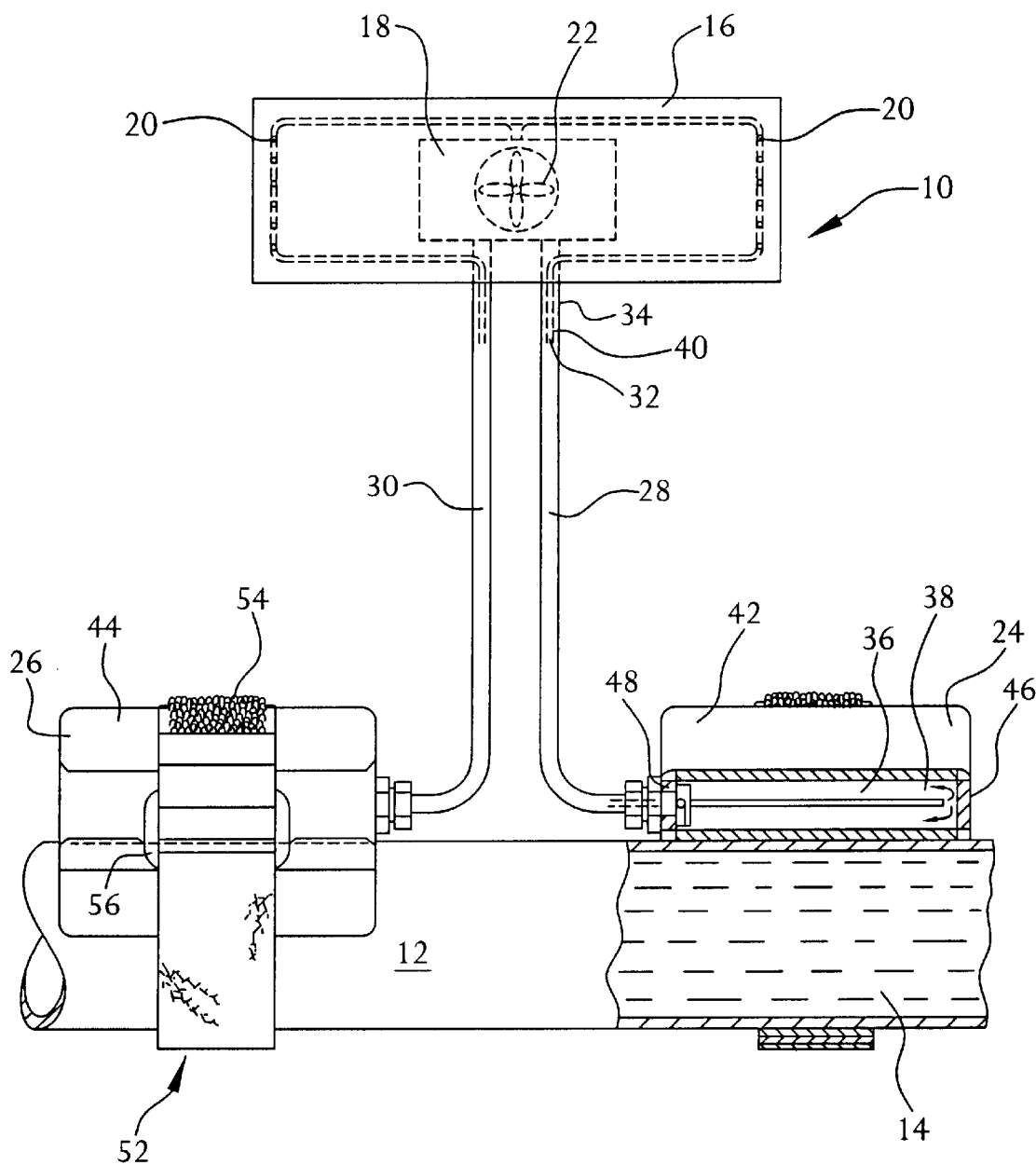
FIG. 9 is a schematic view of the prior art portable pipe freezer of U.S. Pat No. 5,548,965.

Referring to FIG. 9, the pipe freezer apparatus system (10) is installed on a pipe (12) to freeze the water (14) inside a section of pipe to form an ice plug. The piper freezer includes a portable condenser/compressor unit (16) that has a compressor (18), a pair of condensers (20), and a fan (22). The condenser/compressor unit is connected to a pair of evaporators (24 and 26) by flexible coaxial hoses (28 and 30, respectively). The coaxial hoses have an inner tube (32) and an outer tube (34). The inner tube delivers high-pressure liquid refrigerant to an evaporation chamber and the outer tube returns refrigerant vapor from the evaporation chamber to the condenser/compressor unit.

In the well-known refrigeration cycle, liquid refrigerant (36) under high pressure enters through the inner tube (32) into an inner chamber (38) of the evaporators. The inner tube extends well into the chamber and acts as a metering device to spray the liquid refrigerant into the low-pressure inner chamber of the evaporators. As the refrigerant evaporates, it absorbs heat from the evaporator (24) and by conduction heat exchange from the adjacent pipe and the water inside the pipe. The refrigerant vapor is drawn from the evaporator through the outer tube (34) by suction and returned into the compressor 18, which raises the pressure of the vapor. The high pressure vapor passes through a condenser, in which the vapor is exposed to a large cooling surface area from which heat is convected by the fan (22). The refrigerant (36) is cooled to the condensation temperature, releases its heat of condensation and changes phase back into a liquid at high pressure to complete the cycle.

Figure 1:
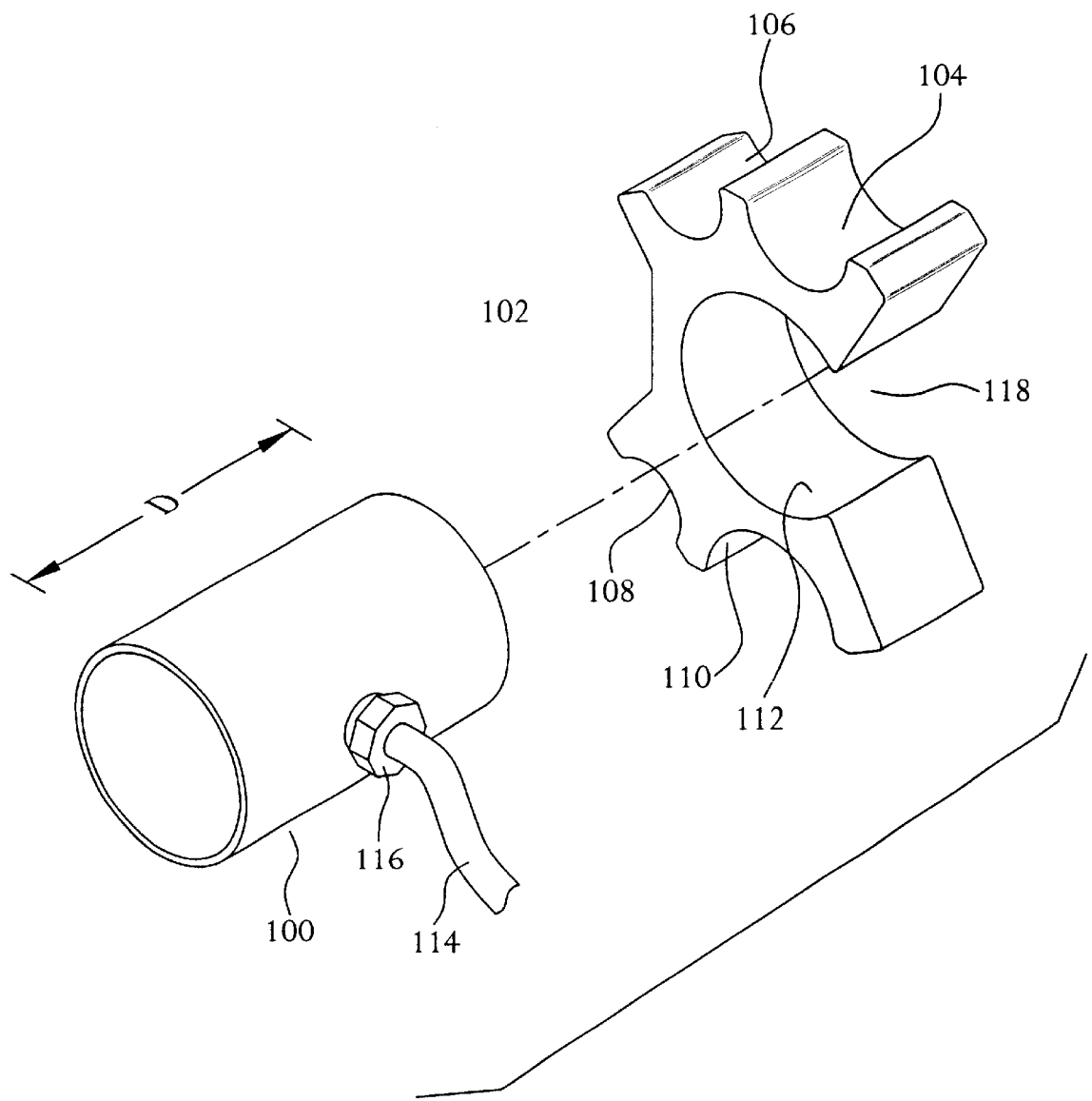
FIG. 1 is a perspective view of a cylindrical evaporator chamber and one of a set of adapters for different standard diameters of pipe.

This invention changes the configuration of the evaporators. As shown in FIG. 1, the evaporation chamber is inside a metal cylinder 100 or evaporator head. The evaporator head is provided with a set of interchangeable adapters to fit pipes of different standard diameters. The adapter 102 in FIG. 1 has different-sized, nearly semi-circular channels (104, 106, 108 and 110) for a conforming fit along relatively small (e.g., 15 mm, 18 mm, 22 mm and 28 mm) diameter pipes. The adapter also has a greater than semicircular channel 112 conforming to the outer diameter of the evaporator head to receive the evaporator head and to hold the evaporator chamber in a position such that the length axis ("D" in FIG. 1) is aligned parallel to the axis of a pipe placed in any of the semicircular channels.

The coaxial hose (114) does not enter along the end of the cylinder, but rather enters through a hose coupling (116) that is located approximately midway along the length (D) of the cylinder. The hose coupling directs the inner tube of the hose essentially perpendicular or at right angle to the length axis of the evaporation chamber.

The channel 112 on the adapter has a arc of greater than 180 degrees, but preferably not more than about 330 degrees, so that the cylindrical evaporator head can slide into the channel with the hose and hose coupling in the slot 112 that is left open. It is most preferable to have the slot extend even further to permit the cylinder to turn and rotate the coupling through about 45 degrees so that the hose can be positioned according to the space and obstacles around the pipe. The connection to the evaporator in a direction at right angles to the pipe generally permits the freezer unit to be used in more confined space than orienting the hoses along the axis of the pipe, as in the prior pipe freezer.

Figure 2:
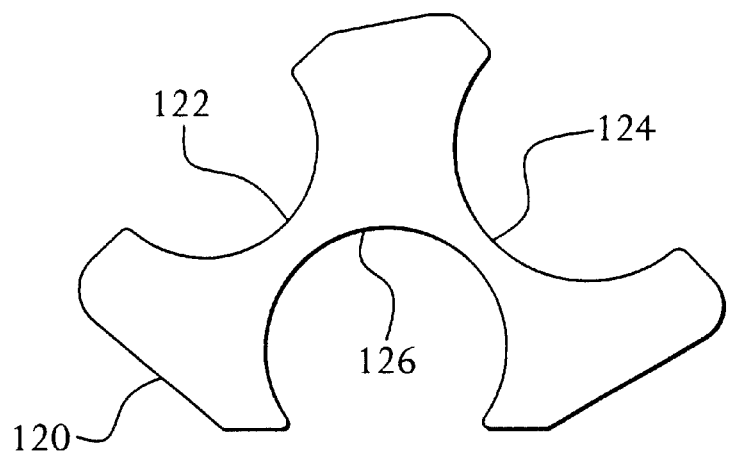
FIG. 2 is a profile view of another adapter.
Figure 3:
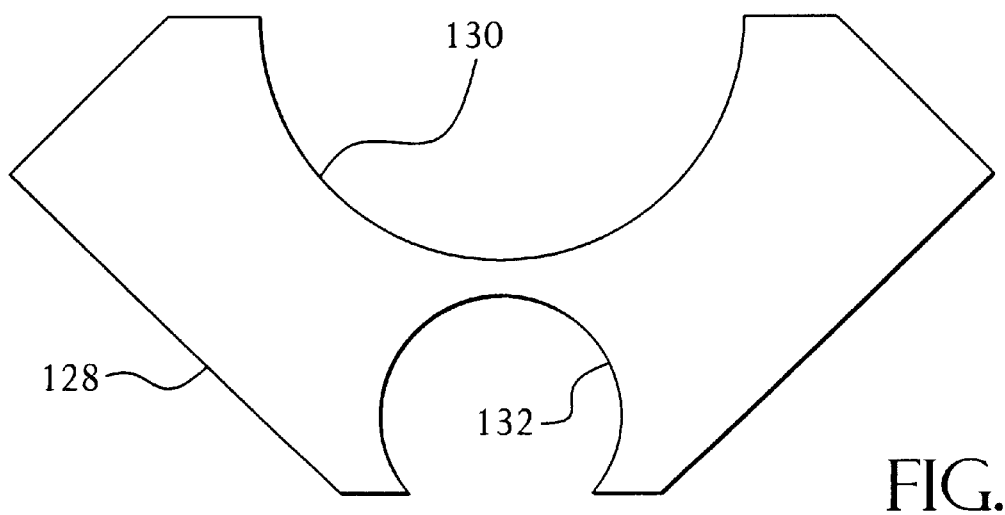
FIG. 3 is a profile view of another adapter.

Other adapters in the set are shown in FIGS. 2 and 3. The adapter (120) of FIG. 2 has two nearly semi-circular channels (124 and 122) conforming to the outer diameter of intermediate sized pipes (e.g. 35 mm and 42 mm, or 48 mm and 60 mm)). The adapter (128) of FIG. 3 has a single nearly semi-circular channel (130) for a relatively large pipe (e.g. 73 mm or higher.). The greater than semi-circular channel (126 and 132) for the evaporator head is the same as the channel (112) on the adapter 102 of FIG. 1.

Figure 4:
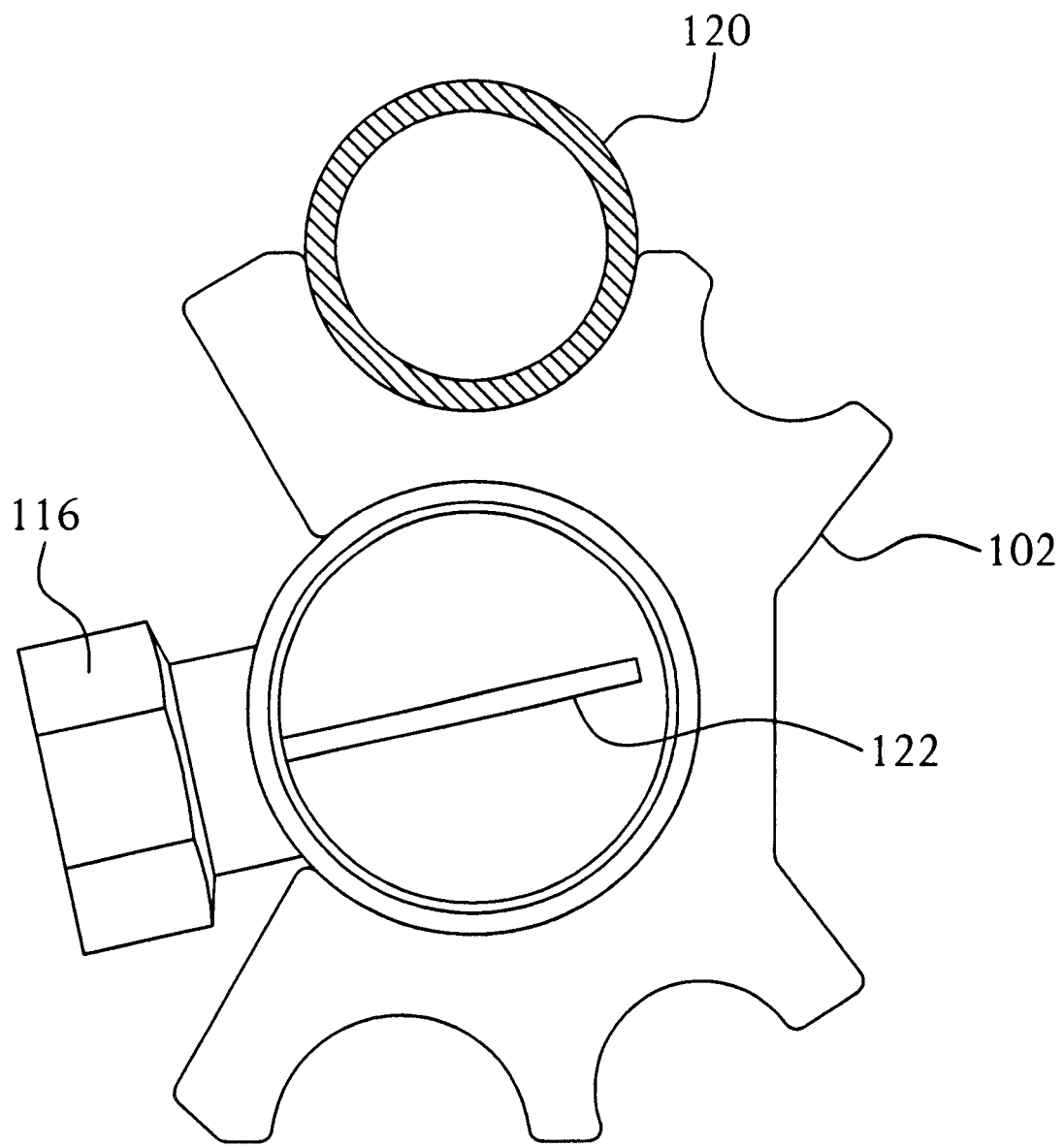
FIG. 4 is a section view of an evaporator chamber and adapter on a pipe.

Referring now to FIG. 4, when the adapter (102) is placed on a water pipe (120), the hose coupling directs the hose in a direction essentially at right angle to the axis of the pipe. The inner tube (122) of the hose projects through the coupling to near the opposite inner wall of the cylinder to spray the liquid refrigerant against the wall. As the refrigerant evaporates, the vapor is drawn back into the coupling to the outer tube of the hose. Since the coupling orients the inner tube essentially perpendicular to the length axis of the chamber, the distance from the end of the inner tube back into the coupling is not as great as when the inner tube is aligned with the length axis. This situation may result in less efficient heat transfer, as some liquid refrigerant may be drawn back into the outer hose and evaporate on return to the compressor rather than in the chamber.

Figure 5:
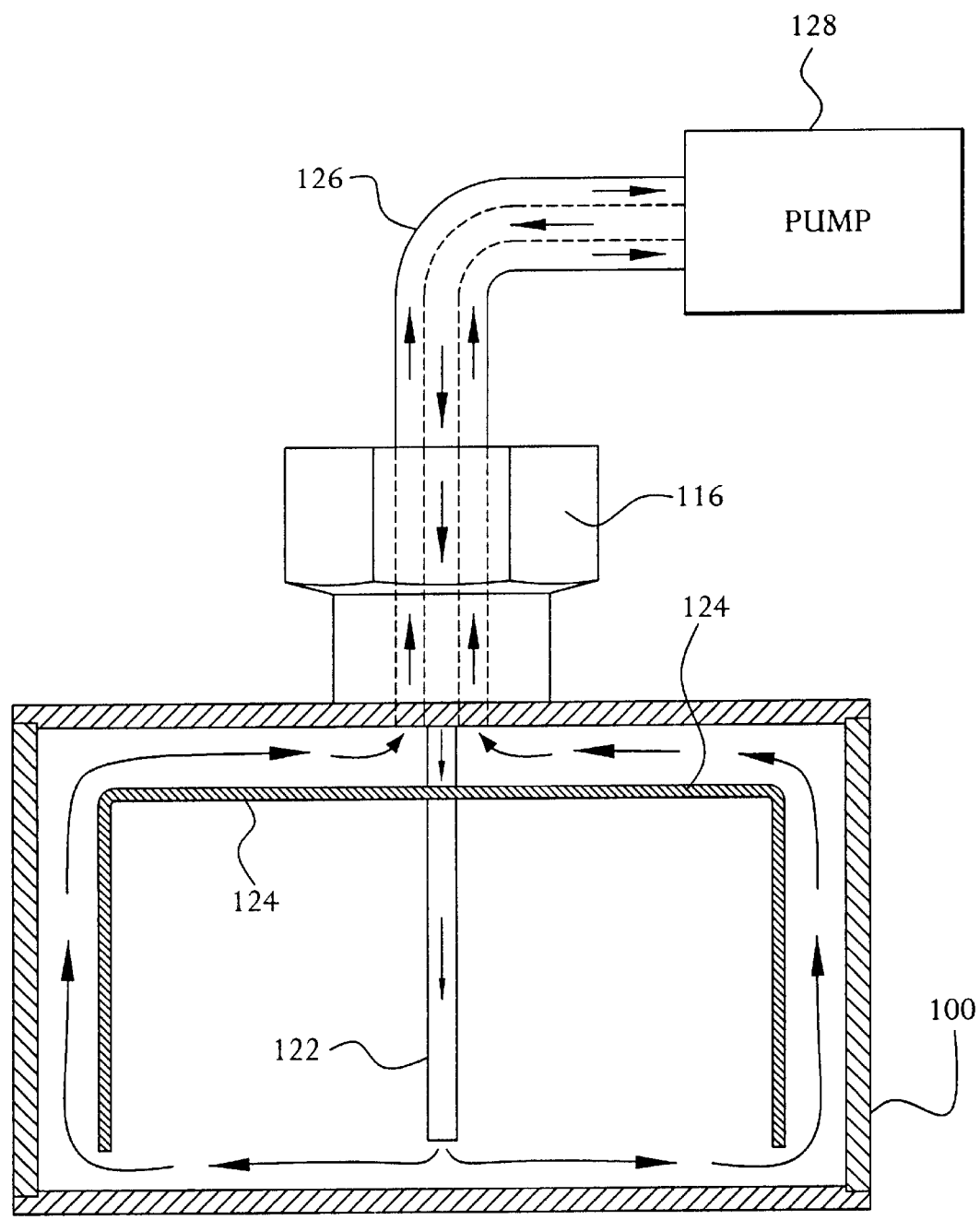
FIG. 5 is a schematic view of an evaporator in section connected to a condenser/compressor unit to show flow path of refrigerant.

To make the evaporation in the chamber more efficient, a metal baffle plate (124) is placed in the evaporator head, as shown in FIG. 5. The baffle plate preferably is located in a chord of the cylindrical chamber near the hose coupling and extends toward and nearly to the end walls of the chamber. The plate (124) may be a flat plate extending along the length of the chamber and terminate near the end plates, or as in FIGS. 5 and 6, may then extend along the end plates. The inner tube (122) of the hose extends through the baffle plate. Thus, refrigerant sprayed from the inner tube (122) must migrate to the ends of the chamber to pass around the plate (124) and return to the midpoint of the chamber to be pulled into the coupling for return to the compressor/condenser (128) in the outer tube of the hose (126). This longer path makes more evaporation take place in the chamber and promotes more efficient heat exchange.

Figure 6:
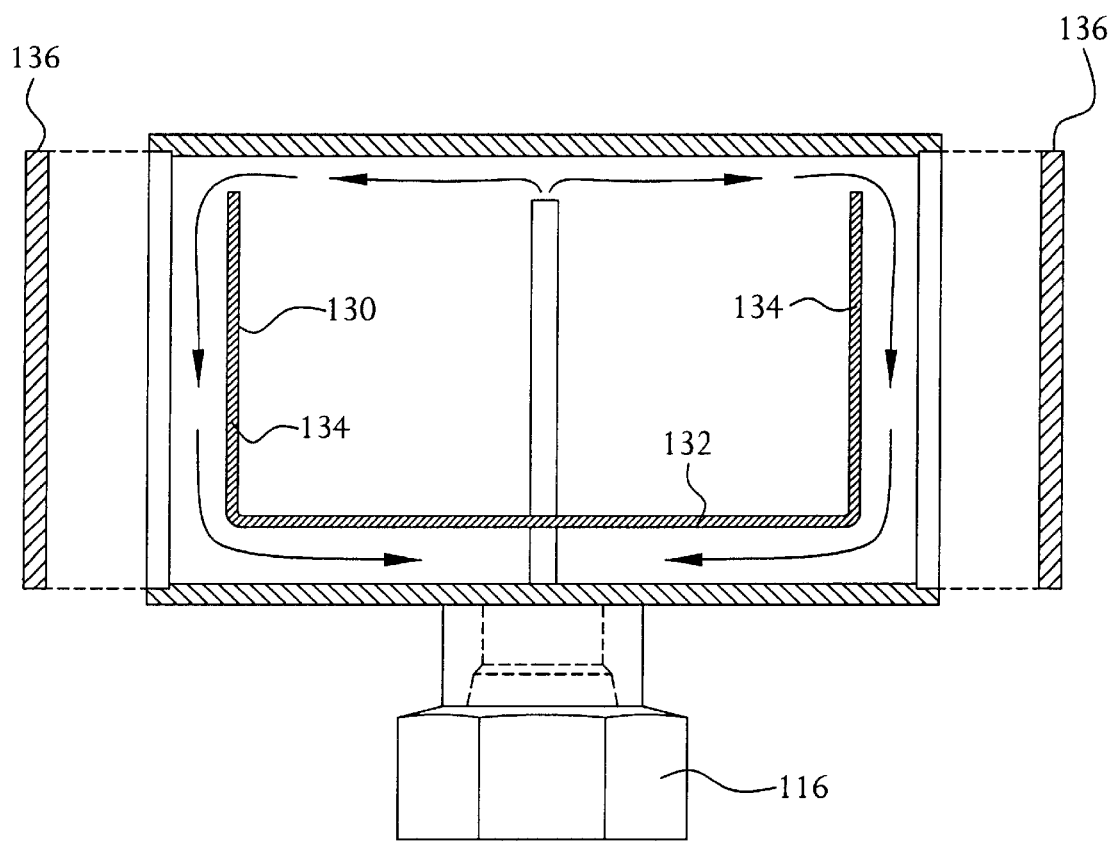
FIG. 6 is a section view of a cylindrical evaporation chamber with a preferred configuration of baffle.

FIGS. 5 and 6 show a preferred configuration of baffle. The baffle (130) is saddle-shaped with a long flat top section (132) and two end sections (134) close to and essentially parallel to the end walls (136) of the cylinder. This creates a large evaporation space inside the baffle and forces the refrigerant to migrate essentially along the perimeter of the chamber before re-entering the hose coupling (116).

Figure 7:
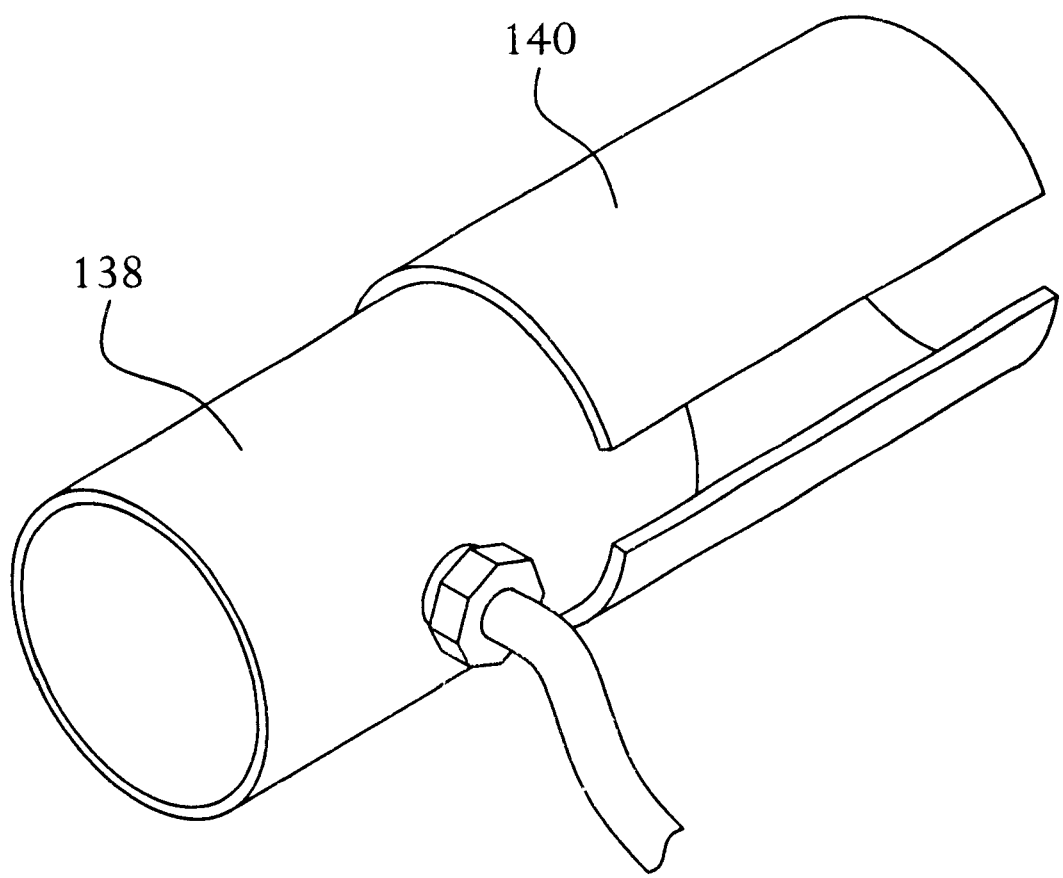
FIG. 7 is a partially exploded view of an evaporation chamber with a replaceable protective sleeve.

FIG. 7 shows another preferred construction of a cylindrical evaporation chamber. The chamber, as described in previous embodiments, is formed as a hollow right cylinder (138) closed at both ends by end plates (136). The cylinder and plates are formed from a heat conductive metal, preferably aluminum. To obtain good heat conduction between the chamber and the adapter, the surface of the cylinder should make a tight conforming fit into the adapter. This smooth fit would be lost if the cylinder became dented or scratched, as softer metals are prone to become in a working environment. To protect the valuable evaporation chamber, it is preferred to install over it a replaceable protective sleeve (140), as shown in FIG. 7. The sleeve is also made of a heat conductive metal, again preferably aluminum. The sleeve has a slot opening to allow the sleeve to slide past the hose coupling onto the cylinder. The adapters are sized to made a tight conformal fit with the sleeve. If the sleeve becomes dented or scratched, it can be replaced at much less cost than the evaporation chamber.

Figure 8:
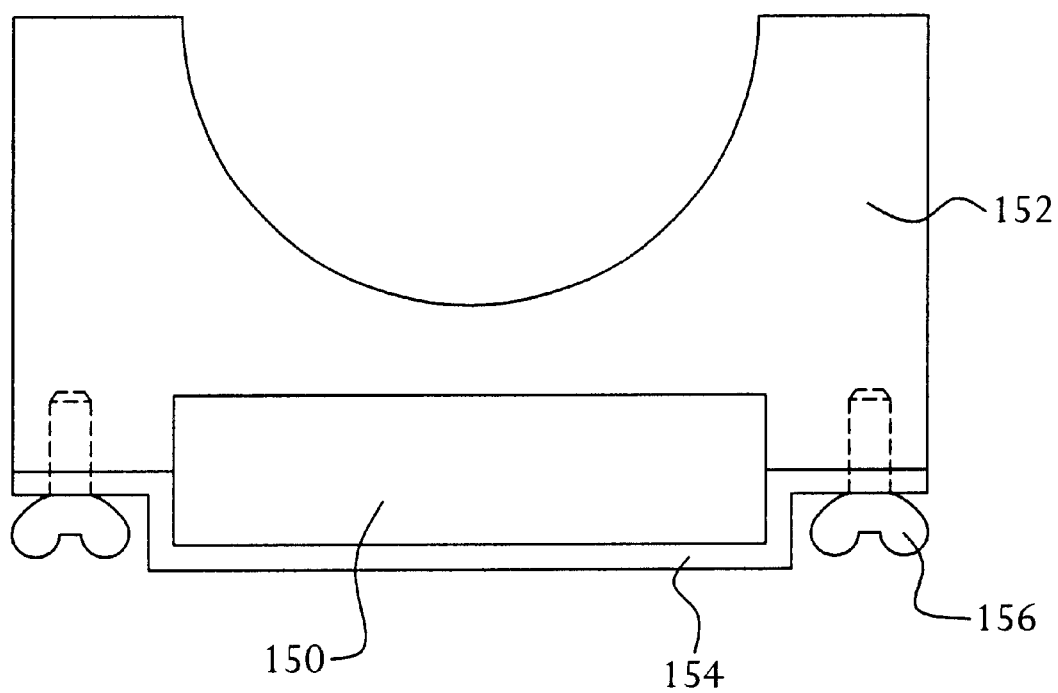
FIG. 8 is a profile view of a rectangular evaporation chamber and an associated adapter.

FIG. 8 shows an alternative shape of evaporation chamber. In the embodiment, the chamber (150) is rectangular in cross section, with its length dimension directed into the paper. The adapter (152) has a rectangular channel for a conformal fit around three sides of the chamber. The rectangular chamber is slide into the adapter, and a bracket (154) is placed over it and held to the adapter by thumbscrews (156) in threaded bores of the adapter. Otherwise, the evaporator is similar to the cylindrical evaporator in that the hose coupling is located approximately midway along the evaporator's length dimension and is oriented perpendicular to the length axis of the chamber. A baffle is preferably located in the chamber between the outlet of the inner tube of the hose and the return to the outer tube to force refrigerant sprayed out of the inner tube to migrate from essentially the midway point of the chamber to an end wall and then back toward the midway point before entering the outer tube. Other shapes of evaporation chamber could also be used in accordance with the invention.

I claim:

1. An apparatus for freezing the contents of a pipe through the use of a refrigeration cycle, comprising:

(a) a portable condenser/compressor unit;

(b) a pair of flexible coaxial hoses connected to the condenser/compressor unit, each hose having an inner tube for the delivery of high pressure liquid refrigerant to an evaporation chamber and an outer tube for the return of refrigerant vapor from the evaporation chamber to the condenser/compressor unit;

(c) an evaporation chamber having a length axis;

(d) a plurality of interchangeable adapters, each adapter being constructed of a heat conductive metal and configured with one or more nearly semicircular channels conforming to a standard pipe diameter such that an adapter can be placed along a section of a pipe, each adapter further configured to receive and hold an evaporation chamber in a position wherein the length axis of the evaporation chamber is aligned parallel to the axis of the pipe when the adapter is placed along a section of pipe; and (e) the evaporation chamber having a hose coupling approximately midway along its length dimension and oriented to couple the chamber to the hose in a orientation such that the inner tube of the hose is directed perpendicular to the length axis of the chamber.

2. An apparatus as in claim 1, wherein the evaporation chamber is in the shape of a right cylinder.

3. An apparatus as in claim 1, wherein the evaporation chamber has a rectangular shape.

4. An apparatus for freezing the contents of a pipe through the use of a refrigeration cycle, comprising:

(a) a portable condenser/compressor unit;

(b) a pair of flexible coaxial hoses connected to the condenser/compressor unit, each hose having an inner tube for the delivery of high pressure liquid refrigerant to an evaporation chamber and an outer tube for the return of refrigerant vapor from the evaporation chamber to the condenser/compressor unit;

(c) an cylindrical evaporation chamber having a length axis and an outer diameter;

(d) a plurality of interchangeable adapters, each adapter being constructed of a heat conductive metal and configured with one or more nearly semicircular channels conforming to a standard pipe diameter such that an adapter can be placed along a section of a pipe, each adapter further configured with a greater than semicircular channel conforming to the outer diameter of the chamber to receive and hold an evaporation chamber in a position wherein the length axis of the evaporation chamber is aligned parallel to the axis of the pipe when the adapter is placed along a section of pipe;

(e) the evaporation chamber having a hose coupling approximately midway along its length dimension and oriented to couple the chamber to the hose in a orientation such that the inner tube of the hose is directed perpendicular to the length axis of the chamber.

5. An apparatus as in claim 4, wherein the interior of the chamber contains a baffle plate oriented with respect to the inner tube such that refrigerant sprayed out of the inner tube must migrate around the baffle before entering the outer tube to return to the condenser/compressor unit.

6. An apparatus as in claim 5, wherein the baffle plate is sized and located such that refrigerant sprayed out of the inner tube must migrate from essentially the midway point of the chamber toward and closely approaching an end wall of the chamber and then back toward the midway point before entering the outer tube.

7. An apparatus as in claim 4, wherein the evaporation chamber is covered by a conforming replaceable sleeve made of heat conductive metal.

8. An apparatus as in claim 5, wherein the evaporation chamber is covered by a conforming replaceable sleeve made of heat conductive metal.

9. An apparatus as in claim 6, wherein the evaporation chamber is covered by a conforming replaceable sleeve made of heat conductive metal.

10. An evaporator head for freezing the contents of a pipe through the use of refrigerant, the evaporator head comprising:

(a) a cylindrical tube of heat conductive metal having an outer surface and a hollow interior and closed by two end plates to form an evaporation chamber;

(b) a coupling located at substantially a ninety degree angle with respect to the outer surface of the chamber for receiving a hose through which refrigerant may be transported into and out of the chamber;

(c) an adapter having one or more pipe receiving surfaces and a surface adapted to make a slide-in engagement with the evaporator head, and (d) at least one baffle located inside the chamber for efficient distribution of refrigerant within the chamber.

11. An apparatus for freezing the contents of a pipe using a refrigerant, the apparatus comprising:

(a) a compressor for compressing the refrigerant from a low pressure gas to a high pressure gas;

(b) a condenser downstream of the compressor for condensing the refrigerant from a high temperature gas to a lower temperature liquid;

(c) a coaxial hose having a first tube extending between the condenser and an evaporator for moving the refrigerant to the evaporator, and having a second tube encircling the first tube, the second tube extending between the compressor and the evaporator for moving the refrigerant from the evaporator to the compressor;

(d) the evaporator comprising an evaporation chamber having an outer surface, two end surfaces and a hose coupling located at a 90 degree angle with respect to the outer surface of the chamber for receiving the coaxial hose; and a slide-on pipe adapter having an outer surface with one or more pipe receiving surfaces for receiving different pipe sizes and a surface adapted to engage the evaporation chamber.

12. An apparatus as in claim 11, wherein the evaporation chamber further includes at least one baffle for efficient distribution of refrigerant entering the system.

13. An apparatus as in claim 11, wherein the evaporation chamber may rotate approximately 45 degrees about a longitudinal axis of the chamber while engaged by the slide-on adapter.

* * * * *